June 6, 1939.  L. W. BLAU ET AL  2,160,824
ELECTRIC EARTH TRANSIENT IN GEOPHYSICAL PROSPECTING
Filed Nov. 13, 1936  5 Sheets-Sheet 1

Ludwig W. Blau
Louis Statham  Inventors
By W. F. Weigester  Attorney

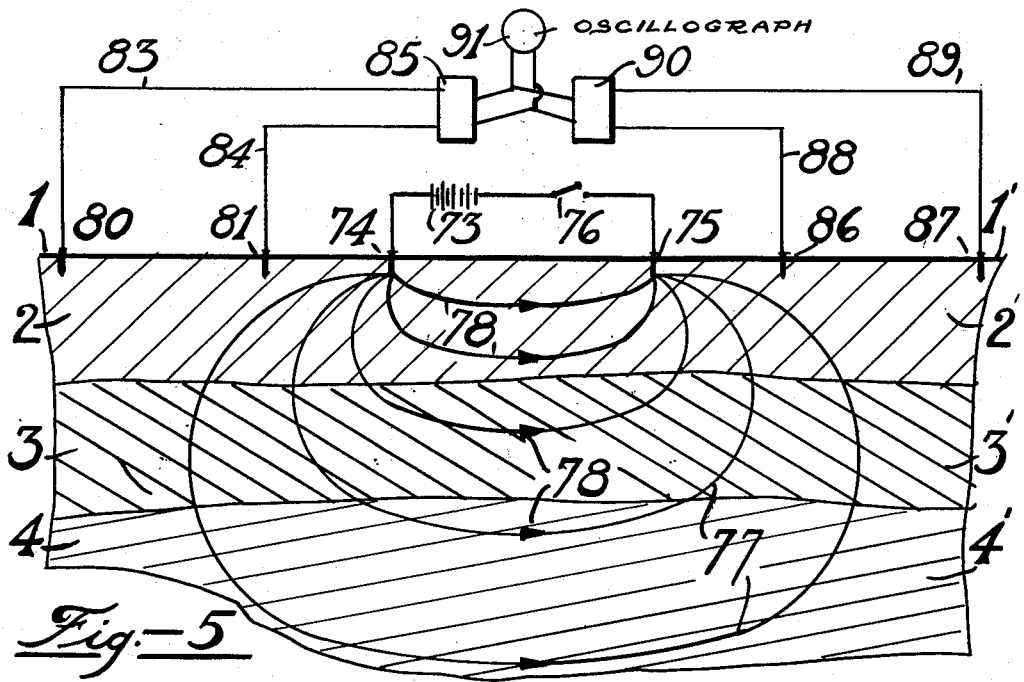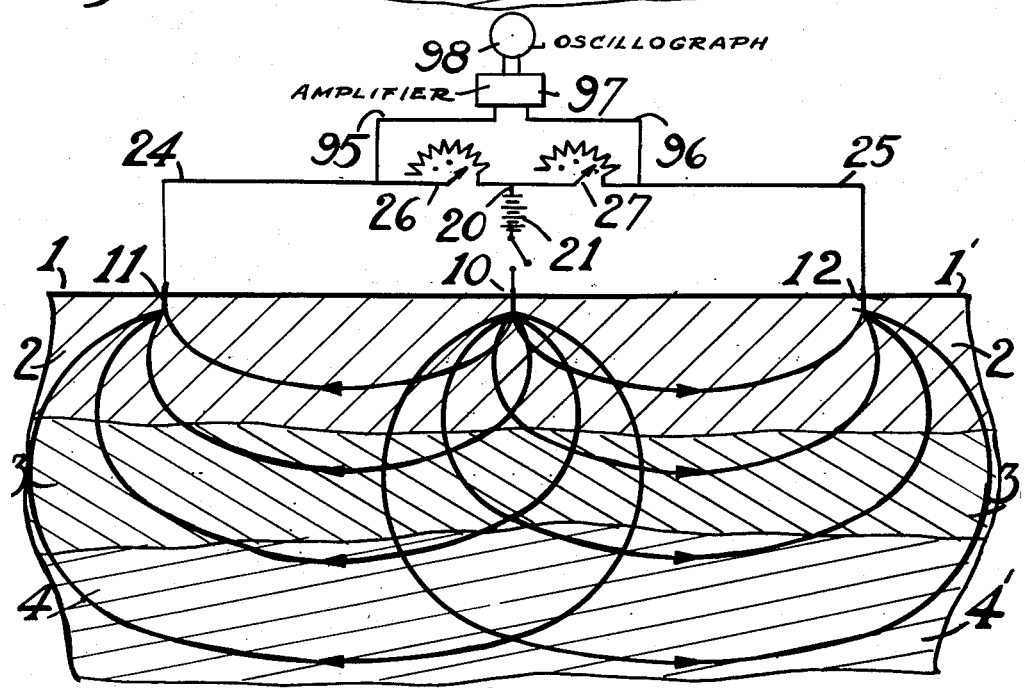

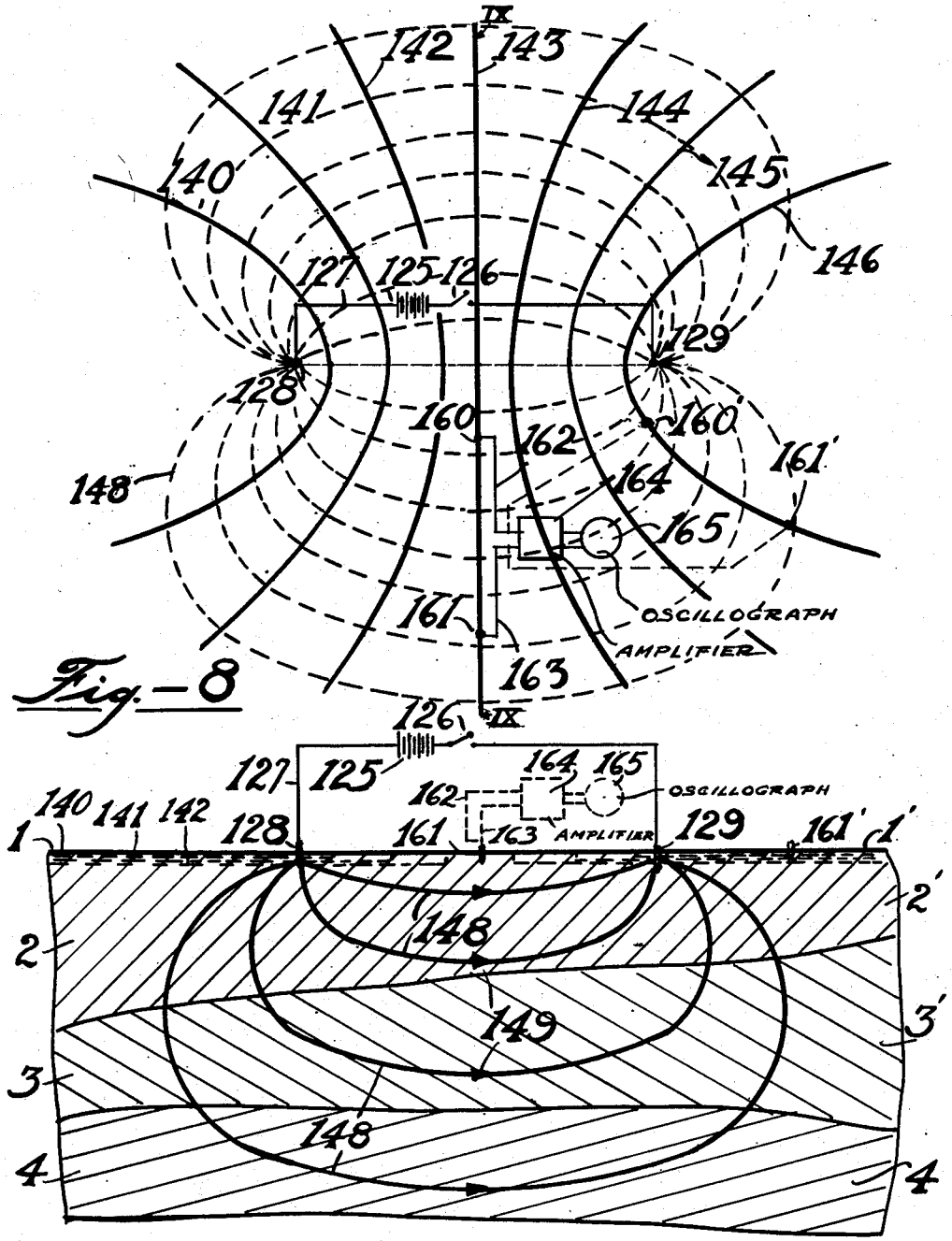

Patented June 6, 1939

2,160,824

UNITED STATES PATENT OFFICE 2,160,824

ELECTRIC EARTH TRANSIENT IN GEOPHYSICAL PROSPECTING

Ludwig W. Blau and Louis Statham, Houston, Tex., assignors to Standard Oil Development Company, a corporation of Delaware Application November 13, 1936, Serial No. 110,566

10 Claims. (Cl. 175—182)

This invention relates to improvements in the use of electric earth transients in geophysical prospecting.

In electric transient prospecting a transient electric field has been sent out between spaced electrodes, called the current electrodes, and has been observed by means of an electric circuit including two other electrodes, called the potential electrodes. A study of the transient so observed has revealed information concerning the electric properties of the earth. In practice it has been found advantageous to observe transient time gradients rather than transients, and for this purpose it has been the custom to cause electric current to flow simultaneously through spaced volumes of the earth, to record the transients so produced in opposite phase at a single receiving station, and to observe the difference between the transients. This is described in the co-pending application of Louis Statham, No. 54,179 filed December 13, 1935, entitled "Method and apparatus for comparing electrical transients", which matured into Patent No. 2,113,749, April 12, 1938.

It is an object of this invention to provide for improved distribution of the current path in the earth and of the transient receiving stations whereby additional information concerning the geological structure of the earth can be obtained.

Other objects will be apparent from the following specification taken in connection with the accompanying drawings, in which latter Fig. 1 is a transverse sectional view through the earth showing in diagrammatic representation a preferred arrangement of apparatus for carrying out the invention.

Fig. 5 is a vertical sectional view through the earth showing a further alternative arrangement of apparatus for carrying out the invention.

Fig. 6 is a vertical sectional view through the earth showing diagrammatically still another arrangement of apparatus for carrying out the invention.

Fig. 8 is a top plan view showing an arrangement of the apparatus in which the potential electrodes are disposed along a given equipotential line.

Fig. 9 is a vertical sectional view through the earth looking along the line IX—IX of Fig. 8.

Figure 1:
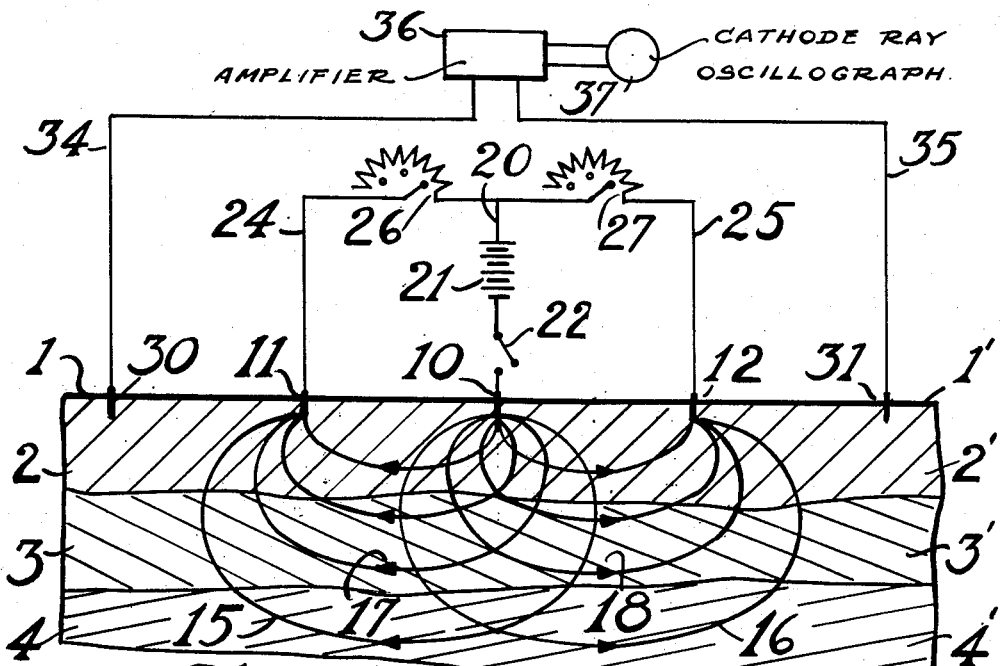
Figure 2:
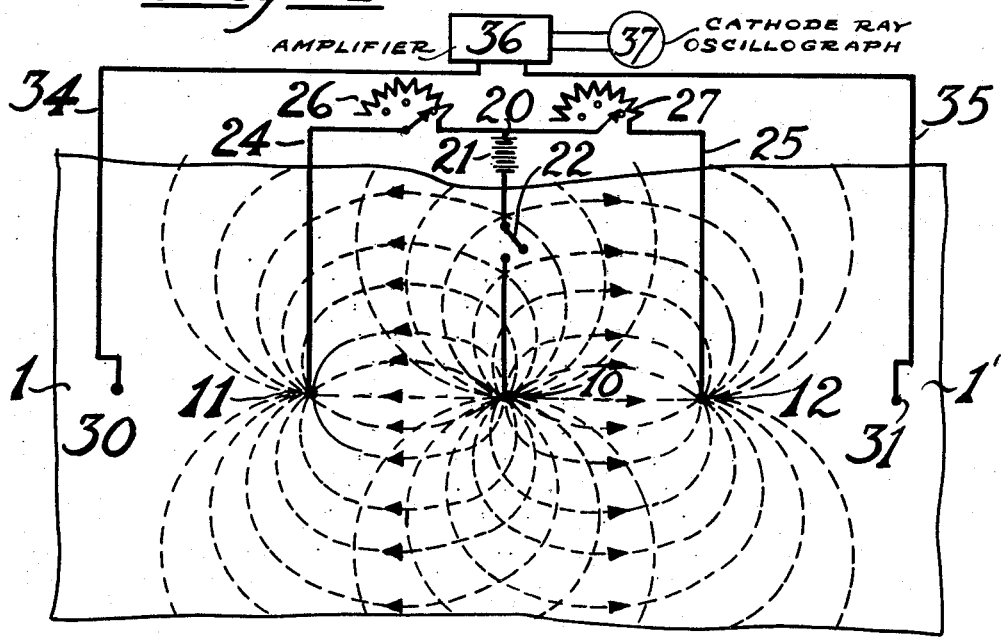
Fig. 2 is a top plan view showing the arrangement of parts in Fig. 1.

Referring particularly to Figs. 1 and 2 of drawings, reference numeral 1—1' designates the surface of the earth or ground. The surface strata are designated 2—2', 3—3' and 4—4'. Direct current is caused to flow through the ground from electrode 10 to electrodes 11 and 12. These electrodes are preferably spaced several thousand feet apart; for example, 2,000 feet apart. The electrodes are preferably disposed substantially in alignment with each other and the electrode 10 is preferably substantially equi-distantly spaced from electrodes 11 and 12. The current flowing through the ground from electrode 10 to electrode 11 flows in the opposite direction to the current flowing from electrode 10 to electrode 12. The lines of current flow are indicated at 15 and 16, and the directions of current flow are indicated by the arrows 17 and 18.

Means are provided for simultaneously passing an electric current through the earth from electrode 10 to electrodes 11 and 12. The means comprises line 20 containing a battery 21 and switch 22. The line 20 is connected at one end to the electrode 10 and at its other end is connected to lines 24 and 25 which lead to the electrodes 11 and 12 respectively. The current flows through a rheostat 26 in line 24, and a rheostat 27 in line 25.

Upon closing the switch 22 the currents begin to flow simultaneously through the earth between electrodes 10 and 11 and electrodes 10 and 12, giving rise to transient electric fields in the earth. By transient is meant the varying current from its zero value at the instant of closing the switch to its steady value sometime afterwards, or any curve representing such current. In the transient state the potential field is not definite, but we may measure the total electric field between two points by means of electrodes which we shall designate as the potential electrodes. In Fig. 1 the means for measuring the total electric field between two selected points in the earth comprises spaced potential electrodes 30 and 31 which are disposed in the earth in substantial alignment with and outside of the current electrodes 10, 11, and 12. The potential electrodes 30 and 31 are connected by lines 34 and 35 to an amplifier 36 and a suitable indicating means, such as a cathode ray oscillograph 37. The potential electrodes 30 and 31 are preferably substantially equally spaced from the current electrodes 11 and 12 respectively for any suitable distance, such as 500 feet. The electrodes 10, 11, and 12 may consist of a short section of copper pipe immersed in a shell or hole containing salt water. The potential electrodes 30 and 31 may be ordinary brass rods driven into the ground to a depth of about one foot.

In carrying out the invention according to the preferred embodiment the transient employed is that of a sudden application of flow of direct current when the switch 22 is closed. The currents begin to flow simultaneously through the current electrodes 11 and 12, giving rise to transient electric fields from the potential electrodes 30 and 31 to the center of the setup at the current electrode 10 and hence to transient potentials at the lines 34 and 35 and the potential electrodes 30 and 31. The rheostats 26 and 27 are adjusted so that the steady state potentials at the electrodes 30 and 31 are equal. The difference between the transient potentials at electrodes 30 and 31 may be observed on the screen of the oscillograph 37. If the electric properties of the earth are symmetrical about the electrode 10 the transient potentials at the potential electrodes 30 and 31 will be equal and no deflection will be observed on the oscillograph screen. If the electric properties of the earth are not symmetrical about the electrode 10 the transient electric field from the potential electrode 30 to the center point at 10 will not be equal to the transient electric field from the potential electrode 31 to the center point at 10, giving rise to a difference of transient potential between the potential electrodes 30 and 31 and a transient will be observed by means of the oscillograph 37.

In a preferred form of the invention the cathode ray oscillograph 37 which is used is of the four plate electrostatic type, the horizontal deflection plates of which are connected to a linear sweep circuit, and the vertical deflection plates of which are connected to the voltage to be recorded and which can be used to impress upon the fluorescent screen any transient phenomena which it may be desired to study by visual observation without the necessity of employing photography.

Figure 3:
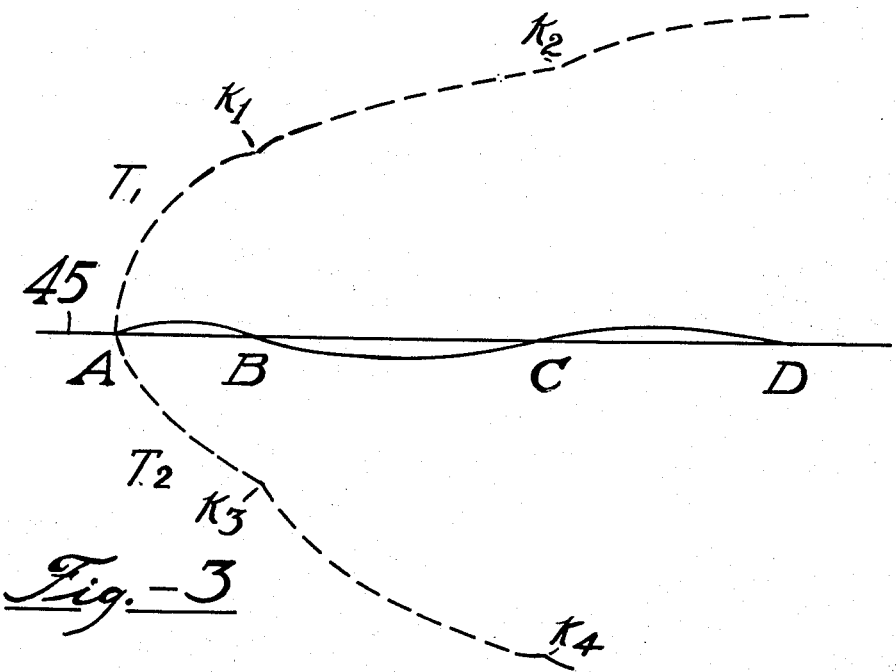
Fig. 3 is a diagram showing the development of a record of the transients obtained using the apparatus of Figs. 1 and 2.

The potentials involved are illustrated in Fig. 3 in which reference numeral 45 designates the zero axis or base line. The point A on the zero axis 45 indicates the simultaneous beginning of the transients $T_1$ and $T_2$. The dotted line $T_1$ leading from the zero axis 45 represents the transient potential difference between potential electrodes 30 and 31 induced by the current through the current electrode 11. The current through current electrode 12 gives rise to the transient potential difference between the potential electrodes 30 and 31 as represented by the dotted line $T_2$. The curve ABCD represents the trace of the transient potential difference between potential electrodes 30 and 31 induced by the application of currents 15 and 16 simultaneously and is the graphical sum of the transients indicated in the dotted lines $T_1$ and $T_2$ in Fig. 3. The trace of the transient difference from A to B indicates that during the interval of time the transient potential difference between the potential electrodes 30 and 31 due to the current through the current electrode 11 of Fig. 1 is rising more rapidly than that due to the current through the current electrode 12. In order to obtain a measurement of the amount of the transient difference we may increase the separation between potential electrode 30 and current electrode 11 until the trace from A to B coincides with the zero axis 45. We may then record the distance and the direction that the electrodes were moved to effect the balance. When the electrodes 30 and 11 have finally been adjusted so that the transients are equal and opposite, the record on the oscillograph screen will appear as a straight line from A to B, and knowing that the time constants of the transients involve both the distances 11 to 30 and 12 to 31 and the conductivity of the earth through which the currents 15 and 16 flow, we may readily calculate the ratio of the effective conductivity of the earth through which current 15 flows to that through which current 16 flows.

In like manner the trace from B to C and from C to D may be made to coincide with the zero axis 45 thereby yielding information concerning the electric properties of the earth at greater depths. Thus the portion of the curve from B to C indicates the difference between the dotted line $T_1$, from kink $K_1$ to kink $K_2$, and the dotted line $T_2$, from kink $K_3$ to kink $K_4$. Likewise, the portion of the curve from C to D indicates the difference between line $T_1$, beyond kink $K_2$, and line $T_2$, beyond kink $K_4$.

The distances and direction that the electrodes are moved to effect the balance of that portion of the transient of Fig. 3 which lies between A and B constitute a measure of the gradient of the electric properties of the earth near the earth's surface. The balancing of the portion of the transient which lies between B and C constitutes a measure of the gradient of the electric properties of the earth in the stratum 3—3' of Fig. 1, and the balancing of the portion of the transient lying between C and D constitutes a measure of the gradient of the electric properties of the earth in the stratum 4—4' of Fig. 1. The time intervals AB, BC, and CD are indications of the relative thicknesses and conductivities of the layers of earth involved. The trace of the transient difference shown in Fig. 3 crosses the zero axis 45 several times due to irregularities in the two transients caused by the presence of earth layers having different electrical characteristics. These irregularities are caused by the building up in steps of the current through the various beds. Immediately after closing the switch 22 almost all of the current is flowing very near the surface of the earth and as time goes on the depth of penetration of the current increases. It is thus possible to distinguish between anomalous surfaces conditions and anomalies which are caused by deeper laid structures. Although the irregularities in the individual transients are very small they can be seen when they are recorded in this manner. The time of duration of the transient is known to increase with increase in the conductivity of the medium and with the distances from current to potential electrodes. In using the invention in the field to explore an area, the sub-surface geological conditions of which are not known, successive instrument setups are made identical with those illustrated in Fig. 1 and successive readings are taken. Preferably each reading is tied in with the preceding reading by leaving one of the potential electrodes in its last position, as described in the co-pending application of Louis Statham No. 54,179 above referred to.

Figure 4:
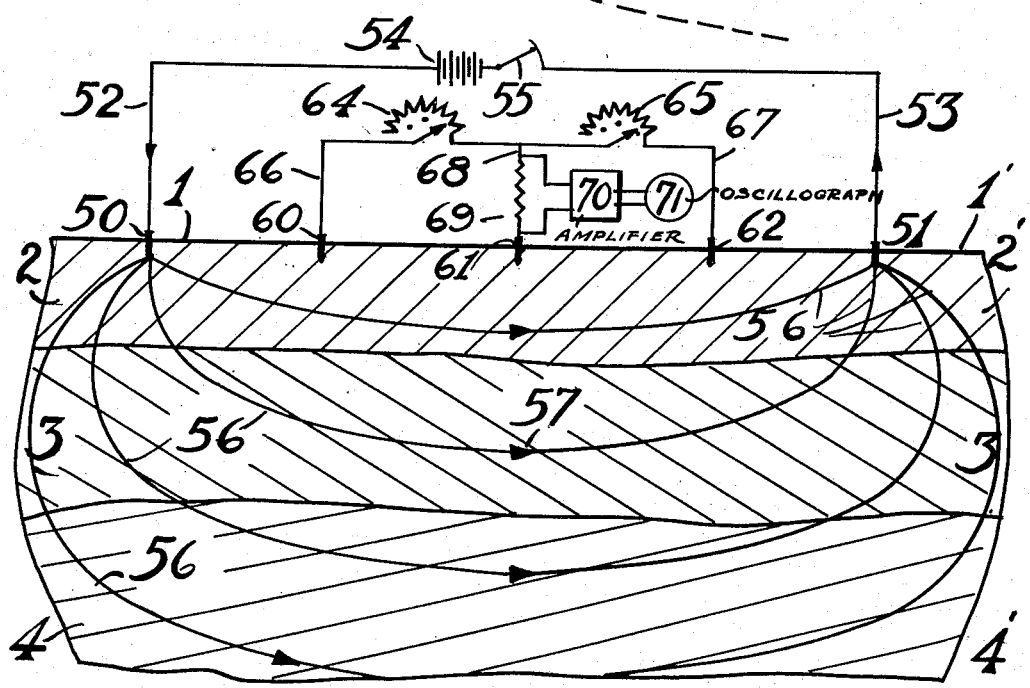
Fig. 4 is a transverse sectional view through the earth showing in diagrammatic representation a modified form of arrangement of apparatus.

Referring to Fig. 4 a modified form of the invention is illustrated in which current electrodes 50 and 51 disposed in the earth are connected through lines 52 and 53 leading to a battery 54 and a switch 55. Lines of force designating the current flow are designated 56, and the direction of current flow is indicated by the arrows 57. Potential electrodes 60, 61, and 62 are disposed in the earth intermediate the current electrodes 50 and 51, and preferably in substantial alignment therewith. A transient current is passed through the earth between the electrodes 50 and 51 upon closing of the switch 55. The difference between the transient potentials at electrodes 60 and 62 is measured by means of a bridge circuit comprising rheostats 64 and 65 in lines 66 and 67 connected to the electrodes 60 and 62 respectively. Line 68 containing a resistance 69 connects the lines 66 and 67 to the electrode 61. An amplifier 70 leads from line 68 on opposite sides of the resistance 69 and is in turn connected to an oscillograph 71. The rheostats 64 and 65 serve to balance out the direct current components of the received transients. If the transient electric field at the potential electrode 60 is equal to that at the potential electrode 62 the difference between the two transients, as observed by means of the oscillograph 71, will be zero. If, however, the transients are unequal, the difference will not be zero. The record obtained by the use of this form of invention will be identical with that illustrated in Fig. 3.

Referring to Fig. 5 a form of the invention is shown in which direct electric current is passed through the earth from a battery 73 through electrodes 74 and 75 when a switch 76 is closed. The lines of current are designated 77, and the direction of flow of the current is indicated by the arrows 78. A pair of potential electrodes 80 and 81 are disposed in the earth in spaced relation to each other and to the current electrodes and in substantial alignment with and exteriorly of the current electrodes 74 and 75. The potential electrodes 80 and 81 are connected through lines 83 and 84 with amplifier 85. A pair of potential electrodes 86 and 87 are disposed in the earth in spaced relation to each other on the opposite side of the current electrodes and in substantial alignment with electrodes 74, 75, 80, and 81. The potential electrodes 86 and 87 are connected through lines 88 and 89 to an amplifier 90. The amplifiers 85 and 90 are connected in opposite phase to an oscillograph 91 so that no deflection will be observed if the transients received between electrodes 80 and 81 and electrodes 86 and 87 respectively are equal. Upon closing the switch 76 the transients are produced at the potential electrodes 80, 81, 86 and 87. The trace of the transient difference may be controlled as before to produce a balance by moving the position of the appropriate electrodes with respect to each other. The amount and direction of displacement of the electrodes necessary to produce the transient balance is a measure of the asymmetry of the electrical properties of the earth about the center of the system. The resultant trace of the transient differences produced by this apparatus has the same general appearance as that illustrated in Fig. 3, and like interpretations may be applied.

Referring to Fig. 6, a modified form of the invention is illustrated, using the arrangement of current electrodes and electric circuit illustrated and described in connection with Fig. 1, and like reference numerals have been applied to like currents. In this form of the invention the current electrodes 11 and 12 function also as potential electrodes. The rheostats 26 and 27 are adjusted so that the steady state potentials at the electrodes 11 and 12 are equal. The transient potentials received at the electrodes 11 and 12 are conducted through the lines 24 and 25 respectively to lines 95 and 96 to an amplifier 97 and oscillograph 98. The observed trace of the transient difference will have the same general appearance as that illustrated in Fig. 3. It may be controlled as before for the purpose of measurement by moving the electrode 10 towards either electrode 11 or 12, according to the polarity of that portion of the trace of the transient difference which it is desired to make coincide with the zero axis on the record.

Figure 7:
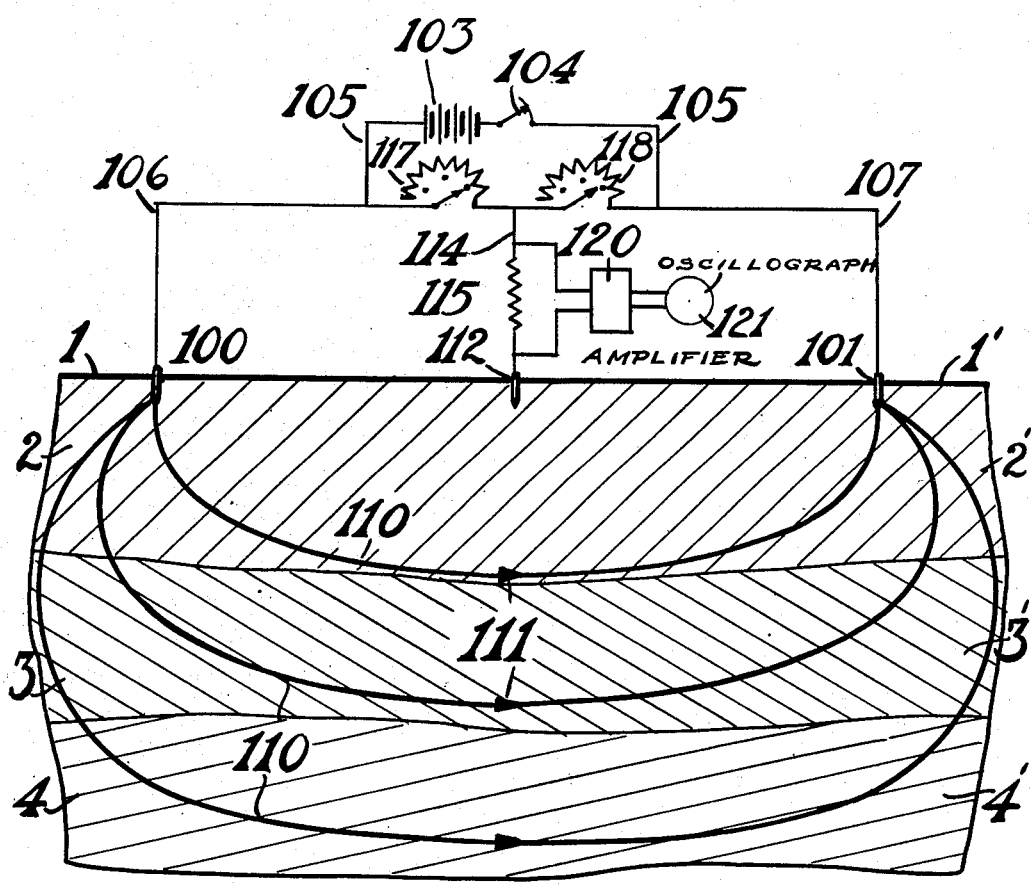
Fig. 7 is a vertical sectional view through the earth showing an alternative form of the invention.

Referring to Fig. 7, still another form of the invention is illustrated in which current electrodes 100 and 101 are embedded in the earth. Direct electric current is passed through the earth between the electrodes 100 and 101 by means of a battery 103 controlled by a switch 104 through a line 105 connected to lines 106 and 107 leading to the electrodes. The lines of current flow are indicated at 110, and the direction of current flow at 111. A potential electrode 112 is disposed in the ground intermediate the electrodes 100 and 101. A line 114 containing a resistance 115 connects the electrode 112 to lines 106 and 107 through rheostats 117 and 118 respectively. An amplifier 120 leads from the line 114 on opposite sides of the resistance 115 and is connected to an oscillograph 121. In this form of the invention the electrodes 100 and 101 function also as potential electrodes. Transients received at the electrodes 100 and 101 are combined and exhibited by the oscillograph. The observed trace of the transient difference will have the same general appearance as that shown in Fig. 3. It may be controlled as before for the purpose of measurement by moving the electrode 112 towards either electrode 100 or 101 according to the polarity of that portion of the trace of the transient difference which it is desired to make coincide with the zero axis 45 of the record shown in Fig. 3.

Referring to Figs. 8 and 9, a form of the invention is illustrated in which use is made of the steady state equipotential lines surrounding the current electrodes. Direct electric current is passed through the earth by means of a battery 125 and switch 126 which are connected through a line 127 with current electrodes 128 and 129 embedded in the ground. Reference numerals 140 to 146 inclusive represent equipotential lines which are created at the earth's surface by difference of potential between the energization electrodes 128 and 129 if the subjacent earth within significant proximity of these electrodes is of uniform conductivity. These equipotentials represent the intersection of the earth's surface with equipotential surfaces. The current lines are designated 148 and the direction of current flow by the arrows 149. Potential electrodes 160 and 161 are embedded in the ground and are connected by lines 162 and 163 to an amplifier 164 and oscillograph 165. In the embodiment illustrated, the potential electrodes 160 and 161 are disposed on the median potential line 143 but may be placed on any equipotential line as shown by the dotted line connection to electrodes 160' and 161'. In using this form of the invention a transient electric field is observed without the direct component since both potential electrodes are placed on the same steady state equipotential line. The transient observed in this manner will have the same general appearance as the transient difference shown in Fig. 3. The various deflections of the transient from the zero line 46 indicate, however, when this embodiment of the invention is employed, the tilting of the various beds of which the earth is composed. If the deflections vanish, when the potential electrodes are placed symmetrically on either side of a straight line connecting the two current electrodes 128 and 129, then the beds are parallel to the surface of the earth, but if the deflections do not vanish the beds are not parallel to the surface and the angles of deviation from the parallel are proportional to the magnitude of the deflections.

While the invention has been described as applied to the surface of the earth, it will be understood that it can be carried out in water, under water, along the sides of cliffs, or other vertical structures, in bore holes such as oil wells or in mines. Also it can be applied to the determination of the electrical properties of other materials, such as metals, semi-conductors, and insulators.

Various changes and alternative arrangements may be made within the scope of the appended claims in which it is our intention to claim the novelty inherent in the invention as broadly as the prior art permits.

We claim:

1. The method for the determination of electrical properties of matter, which comprises passing an electric current between spaced electrodes in the matter whereby a plurality of transients are obtained, thereby producing transient potentials outside of the electrodes, the time constants of which are functions of the distances of the transient potentials from the electrodes and the electrical properties of the matter, separately receiving some of the transient potentials, combining the transient potentials, and exhibiting the effects of the combination of the transient potentials.

2. In the determination of underground structure, the improvement which comprises causing a direct electric current to flow through the earth, establishing a plurality of electrical circuits a portion of each of which extends through spaced portions of the earth in the field of influence of the current, receiving an indication of the transient of said current at said portions as modified by the passage of the current through the earth, combining the transients, and exhibiting the effects of the combination of transients.

3. Apparatus for geophysical prospecting which comprises spaced electrodes in the ground, means for passing a transient electric current through the ground including subsurface strata between the electrodes, means for receiving at least two transients of said current as modified by its passage through spaced portions of the ground, means for combining the transients, and means for exhibiting the effects of the combination of said transients.

4. Apparatus for geophysical prospecting which comprises spaced current electrodes in the ground in substantial alignment with spaced potential electrodes, means for passing a direct electric current through the ground between the current electrodes, means for receiving at least two transients of said current as modified by its passage through the ground at the potential electrodes, means for combining the transients, and means for exhibiting the effects of the combination of transients.

5. Apparatus for geophysical exploration comprising spaced electrodes in the ground, an electric circuit connecting the electrodes, including a source of electric energy whereby electric current is passed through a volume of the ground including sub-surface strata between the electrodes, a plurality of electric circuits including portions of the ground in the field of influence of the current for receiving indications of the transient of said current as modified by its passage through the ground, means for combining the transients, and means for exhibiting the effects of the combination of transients.

6. Apparatus for geophysical prospecting which comprises spaced electrodes in the ground, means for passing a transient electric current through the ground between the electrodes, a plurality of electric circuits including a common electrode in the ground and two electrodes on opposite sides of and aligned with the common electrode for receiving indications of the transient of the current, means for combining the transients, and means for exhibiting the effects of the combination of transients.

7. Apparatus for geophysical prospecting which comprises spaced electrodes in the ground, an electric circuit including means for passing an electric current through the ground between the electrodes whereby transients of said current are modified by their passage through the ground, a potential electrode intermediate the current electrodes connected to the electric circuit to thereby constitute with said current electrodes two transient receiving circuits, means for combining the transients, and means for exhibiting the effects of the combination of said transients.

8. The method of geophysical prospecting which comprises impressing a voltage upon spaced electrodes in the ground whereby a current is caused to flow from one electrode to the other, establishing a pair of circuits between two pairs of spaced points arranged in the path of said current in symmetrical relation to said electrodes, receiving a transient of said current in each of said circuits, opposing said transients to each other and recording the resultant of the two.

9. The method of geophysical prospecting which comprises initiating a difference in potential between spaced points in the ground to thereby effect a change in current flow between said points, establishing a receiving circuit between each pair of two pairs of spaced points along the path of said current whereby a transient is set up in each receiving circuit, opposing the transients of the two circuits to each other and exhibiting the difference between said transients.

10. The method of geophysical prospecting which comprises impressing a voltage upon spaced electrodes in the ground whereby a current is caused to flow from one electrode to the other, establishing a pair of circuits between two pairs of spaced points arranged in alignment with said electrodes, and symmetrically with respect thereto, receiving a transient of said current in each of said circuits, opposing said transients to each other, recording the resultant of the two and adjusting the distances between said points and said electrodes until said resultant is zero.

LUDWIG W. BLAU.
LOUIS STATHAM.